July 11, 1933.   A. KELLY   1,918,110
MANUFACTURE OF BORIC ACID
Filed March 11, 1931
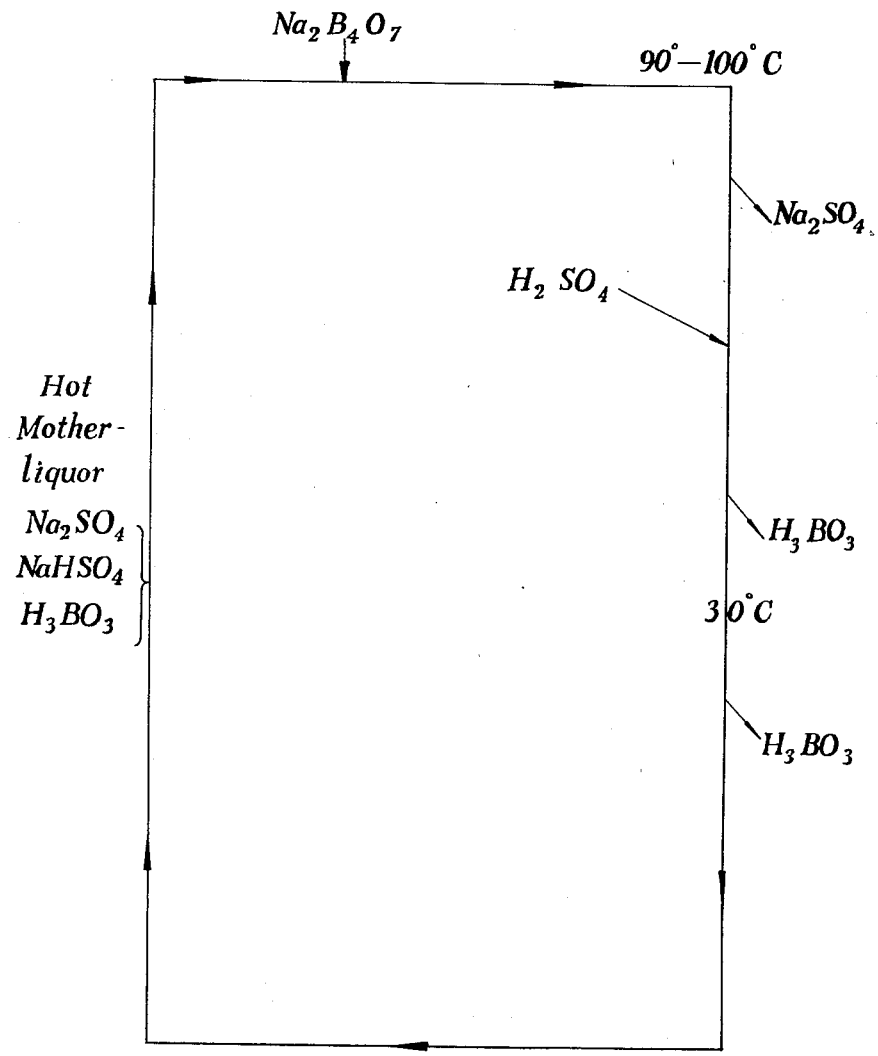
INVENTOR
Andrew Kelly.
BY William C. Linton
ATTORNEY

UNITED STATES PATENT OFFICE

ANDREW KELLY, OF LONDON, ENGLAND, ASSIGNOR TO BORAX CONSOLIDATED LIMITED, OF LONDON, ENGLAND

MANUFACTURE OF BORIC ACID

Application filed March 11, 1931, Serial No. 521,884, and in Great Britain August 20, 1930.

This invention relates to the manufacture of boric acid and its principal object is to effect an economy in the cost of production.

The process according to this invention consists in adding borax in any degree of hydration to a hot solution of sodium sulphate and sodium bisulphate in sufficient quantity to form a very highly concentrated liquor, boiling said liquor and, after decanting it from the sodium sulphate thrown out, precipitating boric acid by adding a considerable excess of sulphuric acid to said liquor, and finally cooling the charge down to 30° C. to obtain a further yield.

One convenient example for carrying the process into practical effect is as follows:—

To 1000 gallons of hot mother liquor from a previous charge which contains:—

|  | Per cent |
|---|---|
| Boron-trioxide | 4.5 |
| Sodium bisulphate | 18.0 |
| Sodium sulphate | 36.0 | is added 4760 pounds of prismatic borax ($Na_2B_4O_7 10H_2O$). The whole is then boiled and allowed to stand for a short time and the clear liquor is decanted from any precipitated sodium sulphate. To this strong liquor is added 1250 pounds of sulphuric acid (specific gravity 1.843) which is sufficient to decompose the acid borates present and to convert a portion of the sodium sulphate into sodium acid sulphate and the whole is cooled to 30° C. The boric acid is separated from the liquor by known methods and the yield is 3090 pounds. The mother liquor is then carried forward for a further charge.

It is not desirable to cool the liquor below 30° C. because the comparatively very small further yield of boric acid below that temperature would not compensate for the waste of heat units in obtaining it.

What I claim is:—

A process for the manufacture of boric acid which comprises adding borax to a hot mother liquor containing sodium sulphate, sodium bisulphate, and boric acid, boiling said mother liquor to precipitate anhydrous sodium sulphate, decanting the resultant solution from said sodium sulphate, adding an excess of sulphuric acid to said decanted solution, thereby causing some precipitation of boric acid and conversion of some $Na_2SO_4$ to $NaHSO_4$, cooling said decanted liquor down to a temperature of approximately 30° C., whereby additional boric acid is crystallized out, separating boric acid from the resultant mother liquor, heating said mother liquor, adding borax to said hot mother liquor and repeating the cycle of steps.

In testimony whereof he affixes his signature.

ANDREW KELLY.